Patented Nov. 5, 1946

2,410,407

UNITED STATES PATENT OFFICE 2,410,407

MANUFACTURE OF CARBAMIDE DERIVATIVES

John R. Durland, Nitro, W. Va., assignor to Monsanto Chemical Company, St. Louis, Mo., a corporation of Delaware No Drawing. Application July 15, 1942,
Serial No. 451,011

15 Claims. (Cl. 260—302)

The present invention relates to a process of preparing derivatives of carbamides. More particularly this invention relates to a process of reacting a mercaptothiazole or selenium analogue with formaldehyde and a carbamide. By a carbamide is meant a compound having the formula

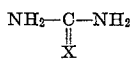

where X is sulfur, oxygen or selenium. Still more particularly this invention relates to a process of preparing N,N' bis(thiazylthiomethyl) carbamides. These compounds find useful application as accelerators of vulcanization.

In accordance with this invention it has been discovered that materials having a basic reaction are valuable adjuvants in the reaction between the mercaptothiazole, formaldehyde and a carbamide. For example, it has been found that a basic substance catalyzes the reaction and reduces the time of the reaction cycle. While the reaction may be effected in a suitable organic solvent, as for example alcohol, the use of water as a reaction medium possesses certain economic advantages. One of the particular advantages of this invention is that it provides a method for conducting the reaction in aqueous medium. In the absence of the catalyst, the yields are low, the product of inferior quality and difficult to process. However, the addition of an alkaline reacting material, as for example an alkaline reacting salt, to the reaction medium whether aqueous or organic, gives eminently satisfactory results. The invention appears to be broadly applicable to organic and inorganic alkaline reacting substances and includes particularly alkalies, basic salts, salts of strong bases and weak acids, tertiary amines and the like.

The manner in which alkaline reacting substances function to improve the reaction is not known and it is to be understood that this invention is not limited to any theory or explanation of the effects observed. While one effect of the preferred adjuvants is to provide a pH which favors the desired reaction, this is not the only factor involved since weakly basic salts are satisfactory whereas adjustment to the same pH with caustic soda gives low yields. However, strong bases can be used if the pH is kept above a certain minimum value. In particular, the pH of the reaction mixture should be at least 7.5 where strong alkali is used. A somewhat higher pH gives a good yield and in addition provides a product which can be more easily washed and filtered but above a pH of 11 none of the desired product is formed.

The following specific embodiments of the invention are illustrative thereof but not limitative of the invention.

EXAMPLE I

Into a reactor of suitable capacity fitted with a stirrer and reflux condenser there was charged substantially 110 parts by weight of technical (91%) mercaptobenzothiazole (substantially 0.60 molecular proportion), 57 parts by weight of 37% formaldehyde (substantially 0.70 molecular proportion) which had been brought to the neutral point (pH 7) prior to its addition, and 150 parts by weight of water. An iron reactor is quite satisfactory although where desired other materials of construction may be used. Where desired the charge, instead of the formaldehyde, may be brought to the neutral point prior to heating, there being little or no difference in the amount of base consumed. The charge was then heated to refluxing temperature for 4 hours after which substantially 19 parts by weight of urea was added together with a suitable catalyst, as for example 5.0 parts by weight of sodium carbonate, and the heating and stirring continued for 6 hours. The reaction mixture was filtered hot and the solids treated with dilute caustic soda in a ball mill to remove any unreacted mercaptobenzothiazole. The insoluble N,N' bis(benzothiazylthiomethyl) urea was filtered off and dried. The results from a series of preparations wherein the catalyst was varied are summarized in the table below:

Table 1

| | Alkaline agent | Parts by weight | pH of reaction mixture | Yield, parts by weight |
|---|---|---|---|---|
| 1 | None | | <6 | 68 |
| 2 | NaOAc | 10 | 6–6.5 | 109 |
| 3 | NaOH | | 6.5–7 | 53 |
| 4 | NaOH | | 8.5 | 100 |
| 5 | NaOH | | 8.5–9 | 107 |
| 6 | NaOH | | 10.0 | 98 |
| 7 | NaOH | | >10.5 | none |
| 8 | Borax | 5 | 9.0 | 109 |
| 9 | Na$_3$PO$_4$ | 5 | 9.0 | 107 |
| 10 | Na$_2$SO$_3$ | 5 | 9.0 | 103 |
| 11 | Na$_2$HPO$_4$ | 5 | 8.0 | 107 |
| 12 | NaHCO$_3$ | 5 | 9–9.5 | 107 |
| 13 | Ca(OH)$_2$ | 5 | 9.0 | 104 |
| 14 | Na$_2$CO$_3$ | 5 | 9–9.2 | 103 |
| 15 | Na$_2$CO$_3$ | 4 | 9.4 | 100 |
| 16 | Na$_2$CO$_3$ | 3 | 9.6 | 104 |
| 17 | NaHCO$_3$ | 1 | 8.9 | 101 |
| 18 | Triethanolamine | 8.2 | 8.0 | 110 |

These results illustrate in striking fashion the benefit derived from the addition of an alkaline reacting material to the reaction mixture. Observations were also made as to the physical form of the products and it was found that sodium carbonate, sodium bicarbonate, triethanolamine, lime and trisodium phosphate gave the most desirable products as regards physical form. Granular products which could be easily filtered and washed were produced. Caustic soda gave a similar easily filtered product providing the pH of the reaction mixture was kept at about 10. Above pH 11 no reaction took place.

The alkaline agents also have the effect of speeding up the reaction cycle. This is illustrated by experiments in which 0.5 molecular proportion of (hydroxy methyl mercapto) benzothiazole and 0.287 molecular proportion of urea were refluxed in alcohol for varying periods of time both with and without 0.06 molecular proportion of sodium acetate. The results are summarized below:

Table II

| Alkaline agent present | Hours reflux | Product formed parts by weight |
|---|---|---|
| No | 20 | 75.8 |
| Yes | 4 | 72.2 |
| Yes | 5 | 82.9 |

It will be noted that in the presence of sodium acetate more of the desired product was formed in 5 hours than was formed in 20 hours without the alkaline agent.

EXAMPLE II

Into a reactor of suitable capacity fitted with a stirrer and reflux condenser there was charged substantially 110 parts by weight of technical (91%) mercaptobenzothiazole (substantially 0.60 molecular proportion), 57 parts by weight of neutral 37% formaldehyde (substantially 0.70 molecular proportion) and 150 parts by weight of water. The charge was heated to refluxing temperature for 4 hours and substantially 24 parts by weight of thiourea and 5 parts by weight of sodium bicarbonate added thereto. The heating and stirring was continued for 6 hours and the reaction mixture worked up as described in Example I. A good yield of N,N' bis(benzothiazyl-thiomethyl) thiourea was obtained.

EXAMPLE III

Into a reactor of suitable capacity fitted with a stirrer and reflux condenser there was charged substantially 10 parts by weight of 2 mercapto dihydro thiazole (2-mercapto thiazoline), substantially 8 parts by weight of neutral 37% formaldehyde and substantially 100 parts by weight of water. The charge was heated at 95° C. for 4 hours, substantially 2.75 parts by weight of urea and 1.0 part by weight of sodium bicarbonate added, and the heating and stirring continued for 20 hours. The hot suspension which had formed was filtered hot and the solids treated with dilute caustic soda in a ball mill to remove unreacted ingredients. The solids were again filtered off and then dried. The product formed was believed to be N,N' bis(dihydrothiazyl thiomethyl) urea. This product was found to possess good accelerating properties in the vulcanization of rubber both alone or when activated by a guanidine type accelerator.

It will be appreciated that the particular procedures described above can be varied widely. For example the mercaptothiazole, formaldehyde, carbamide and alkaline reagent may be mixed together at once instead of first reacting the formaldehyde with either the mercaptothiazole or the carbamide. Results practically identical with those of #14, Table I, were obtained by mixing the mercaptobenzothiazole, formaldehyde, urea and sodium carbonate at the beginning of the reaction. Similarly, the alkaline reagent may be added with the formaldehyde and the carbamide added after the reaction with the mercaptothiazole is complete. Where desired a methylol carbamide may be formed as the first step followed by condensation with the mercaptothiazole in the presence of an alkaline agent. Where convenient or desirable the reactions may be conducted in the presence of a wetting agent. This expedient is of benefit in the case of thiazoles which possess very low solubilities. Examples of typical wetting agents which may be used are decyl benzene sodium sulfonate, the sodium salt of the sulfate of technical lauryl alcohol, mono butyl phenyl phenol sodium monosulfonate, dibutyl phenyl phenol sodium disulfonate and monobutyl diphenyl sodium monosulfonate.

The time of carrying out the reaction is also subject to considerable variation. While very good results are obtained after a 6 hour heating period the reaction continues although slowly after this point.

Other mercaptothiazoles than those mentioned above may be employed in the reaction. Typical examples are 2-mercapto 4-methyl thiazole, 2-mercapto-naphtho-thiazole, 2-mercapto 6-nitro benzothiazole, 2-mercapto 5-chlorbenzothiazole, 2-mercapto 4-methyl benzothiazole and 2-mercapto 4-phenyl benzothiazole. Also corresponding selenium compounds may be used as for example 2-mercapto benzoselenazole, 2-mercapto 6-methyl benzoselenazole, 2-mercapto selenazole, 2-mercapto 6-hydroxy benzoselenazole, 2-selenyl benzoselenazole, 2-selenyl 6-methyl benzoselenazole, 2-selenyl selenazole and 2-selenyl 6-hydroxy benzoselenazole.

Again the present invention is not limited to the specific examples herein set forth. The proportions cited in the examples may be varied without substantially changing the final result. Other alkaline agents than those particularly mentioned may be used. Obviously salts having an acid reaction, as for example mono sodium phosphate, are not suitable.

This invention is limited solely by the claims attached hereto as part of the present specification.

What is claimed is:

1. The method of reacting a compound containing the nucleus

in which Y and Y' are selected from a group consisting of sulfur and selenium, with formaldehyde and a compound having the formula

in which X is selected from the group consisting of oxygen, sulfur and selenium which comprises conducting the reaction at a pH of at least 7.5 but not more than 11 in the presence of a catalyst comprising a substance having an alkaline reaction and isolating a product of the structure

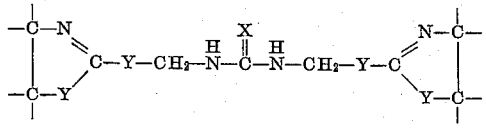

from the reaction mixture.

2. The method of reacting a 2-mercaptothiazole, formaldehyde and a compound having the formula

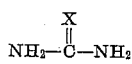

in which X is selected from the group consisting of oxygen, sulfur and selenium which comprises conducting the reaction at a pH of at least 7.5 but not more than 11 in the presence of a catalyst comprising a substance having an alkaline reaction and isolating a bis-N,N'(2-thiazyl thio methyl) urea from the reaction mixture.

3. The method of reacting a 2-mercaptothiazole, neutral formaldehyde and a compound having the formula

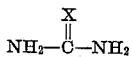

in which X is selected from the group consisting of oxygen, sulfur and selenium which comprises conducting the reaction in the presence of a catalyst comprising a salt having an alkaline reaction and isolating a bis-N,N'-(2-thiazyl thio methyl) urea from the reaction mixture.

4. The method of reacting a 2-mercaptothiazole, formaldehyde and a compound having the formula

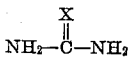

in which X is selected from the group consisting of oxygen, sulfur and selenium which comprises conducting the reaction at a pH within the range of 6-10 in water in the presence of a catalyst comprising a salt of a strong base and a weak acid and isolating a bis-N,N'(2-thiazyl thio methyl) urea from the reaction mixture.

5. The method of reacting a 2-mercapto arylene thiazole, formaldehyde and a carbamide which comprises conducting the reaction at a pH of at least 7.5 but not more than 11 in the presence of a catalyst comprising a substance having an alkaline reaction and isolating a bis-N,N'(2-arylene thiazyl thio methyl) urea from the reaction mixture.

6. The method of reacting 2-mercaptobenzothiazole, formaldehyde and a carbamide which comprises conducting the reaction in the presence of a catalyst comprising a substance having an alkaline reaction at a pH of at least 7.5 but not more than 11 and isolating a bis-N,N'(2-benzothiazyl thio methyl) urea from the reaction mixture.

7. The method of reacting 2-mercaptobenzothiazole, formaldehyde and a carbamide which comprises conducting the reaction in the presence of a catalyst comprising a salt having an alkaline reaction said salt being added to a substantially neutral mixture of the reactants and isolating a bis-N,N'(2-benzothiazyl thio methyl) urea from the reaction mixture.

8. The method of reacting 2-mercaptobenzothiazole, formaldehyde and urea which comprises conducting the reaction at a pH of at least 7.5 but not more than 11 in the presence of a catalyst comprising a substance having an alkaline reaction and isolating bis-N,N'(2-benzothiazyl thio methyl) urea from the reaction mixture.

9. The method of reacting 2-mercaptobenzothiazole, formaldehyde and urea which comprises neutralizing any free acidity introduced by the formaldehyde into the reaction mixture and conducting the reaction in the presence of a catalyst comprising a salt having an alkaline reaction and isolating bis-N,N'(2-benzothiazyl thio methyl) urea from the reaction mixture.

10. The method of reacting 2-mercaptobenzothiazole, formaldehyde and urea which comprises conducting the reaction in water in the presence of a catalyst comprising a member of a group consisting of lime, sodium carbonate, sodium bicarbonate, triethanolamine and trisodium phosphate, and caustic alkali at a pH of about 10 and isolating bis-N,N'(2-benzothiazyl thio methyl) urea from the reaction mixture.

11. The method of reacting 2-mercaptobenzothiazole, formaldehyde and urea which comprises neutralizing any free acidity introduced by the formaldehyde into the reaction mixture and conducting the reaction in water in the presence of a catalyst comprising a salt of a strong base and a weak acid and isolating bis-N,N'(2-benzothiazyl thio methyl) urea from the reaction mixture.

12. The method of reacting 2-mercaptobenzothiazole, formaldehyde and urea which comprises neutralizing any free acidity introduced by the formaldehyde into the reaction mixture and conducting the reaction in water in the presence of a catalyst comprising sodium carbonate and isolating bis-N,N'(2-benzothiazyl thio methyl) urea from the reaction mixture.

13. The method of reacting 2-mercaptobenzothiazole, formaldehyde and urea which comprises neutralizing any free acidity introduced by the formaldehyde into the reaction mixture and conducting the reaction in water in the presence of a catalyst comprising sodium bicarbonate and isolating bis-N,N'(2-benzothiazyl thio methyl) urea from the reaction mixture.

14. The method of reacting 2-mercapto dihydro thiazole, formaldehyde and urea which comprises conducting the reaction at a pH of at least 7.5 but not more than 11 in the presence of a catalyst comprising a substance having an alkaline reaction and isolating bis-N,N'(2-dihydrothiazyl thio methyl) urea from the reaction mixture.

15. The method of reacting 2-mercapto dihydro thiazole, formaldehyde and urea which comprises neutralizing any free acidity introduced by the formaldehyde into the reaction mixture and conducting the reaction in the presence of a catalyst comprising a salt having an alkaline reaction and isolating bis-N,N'(2-dihydrothiazyl thio methyl) urea from the reaction mixture.

JOHN R. DURLAND.